(12) United States Patent
Cole (10) Patent No.: US 7,942,747 B2
(45) Date of Patent: May 17, 2011

(54) VIDEO GAME CONTROLLER RACK

(76) Inventor: Randall C. Cole, Chester Springs, PA (US)

( * ) Notice: Subject to any disclaimer, the term of this patent is extended or adjusted under 35 U.S.C. 154(b) by 866 days.

(21) Appl. No.: 11/982,061

(22) Filed: Nov. 1, 2007

(65) Prior Publication Data

US 2008/0064504 A1    Mar. 13, 2008

Related U.S. Application Data

(63) Continuation-in-part of application No. PCT/US2006/016944, filed on May 3, 2006.

(60) Provisional application No. 60/749,932, filed on Dec. 13, 2005.

(51) Int. Cl.
*A63F 13/08*    (2006.01)
*A47G 29/08*    (2006.01)

(52) U.S. Cl. .......................... 463/47; 211/100

(58) Field of Classification Search ................. 211/85.7, 211/26, 26.2, 70.6, 75, 85.2, 85.9, 85.85, 211/85.5, 44, 57.1, 59.1, 61, 100, 99, 87.01, 211/193; 463/47; 248/121, 176.1; 273/148 B
See application file for complete search history.

(56) References Cited

U.S. PATENT DOCUMENTS

| | | | |
|---|---|---|---|
| 1,013,551 A | 1/1912 | Horton | 248/311.2 |
| 1,490,650 A | 4/1924 | Wagner | 248/170 |
| 1,679,675 A | 8/1928 | Lujan | 248/160 |
| 1,783,749 A | 12/1930 | Roehl | 248/97 |
| 2,007,496 A | 7/1935 | Hurlbut | 248/27.8 |
| 2,100,421 A | 11/1937 | Wupper | 273/265 |
| 2,392,024 A * | 1/1946 | Couri | 446/374 |
| 2,890,801 A | 9/1959 | Ladd et al. | 211/59.1 |
| 3,140,558 A | 7/1964 | Cassidy | 248/449 |
| 3,252,678 A * | 5/1966 | Lasch et al. | 248/220.31 |
| 3,897,724 A | 8/1975 | McDonald | 100/34 |
| 3,915,308 A | 10/1975 | Ratzloff et al. | 211/70.6 |
| 4,166,332 A * | 9/1979 | Donovan | 40/605 |
| 4,223,862 A | 9/1980 | Doughty | 248/222.52 |
| D273,165 S * | 3/1984 | Sternberg | D6/495 |
| 4,494,754 A | 1/1985 | Wagner, Jr. | 273/148 B |
| 4,501,369 A | 2/1985 | Fox | 211/133.1 |
| D278,102 S | 3/1985 | Wagner, Jr. | D6/466 |
| D281,657 S | 12/1985 | Roczey | D14/454 |
| 4,573,682 A | 3/1986 | Mayon | 273/148 B |
| 4,678,087 A * | 7/1987 | York | 211/70.5 |
| 4,865,283 A | 9/1989 | Parker | 248/159 |
| 4,889,304 A | 12/1989 | Glickman et al. | 248/222.13 |
| 4,936,565 A | 6/1990 | Fredrickson | 211/59.1 |
| 4,951,827 A | 8/1990 | Moransais | 211/59.1 |
| 5,031,783 A | 7/1991 | Goudreau | 211/181.1 |
| 5,060,393 A | 10/1991 | Silverman et al. | 33/512 |
| 5,097,966 A * | 3/1992 | Miller | 211/87.01 |
| 5,145,135 A * | 9/1992 | Thompson | 248/201 |
| 5,207,791 A | 5/1993 | Scherbarth | 273/148 B |
| D337,762 S * | 7/1993 | Crane | D14/451 |

(Continued)

*Primary Examiner* — Dmitry Suhol
*Assistant Examiner* — Carl V Larsen
(74) *Attorney, Agent, or Firm* — Young & Thompson (57) ABSTRACT

The present invention is for a storage rack for game controllers and a method of using it. The present invention provides a safe convenient and practical way of storing game controllers when the game controller is not in use by a gamer. The advantage of the present invention is that it organizes the controllers as well as provides a decorative element to a room. The game controller rack includes a vertical member and one or more pairs of cantilever angle members or posts wherein the members have a predetermined lateral spacing and are angled outwardly and upwardly in a predetermined range of angles to provide support for retaining various game controllers.

17 Claims, 6 Drawing Sheets

U.S. PATENT DOCUMENTS

| | | | |
|---|---|---|---|
| 5,346,075 A * | 9/1994 | Nichols et al. | 211/60.1 |
| 5,490,599 A | 2/1996 | Tohidi | 211/171 |
| 5,499,724 A * | 3/1996 | Hickman | 211/70.6 |
| 5,669,515 A * | 9/1997 | Tisbo et al. | 211/70.6 |
| 5,813,549 A * | 9/1998 | Sheehan et al. | 211/87.01 |
| 5,813,550 A * | 9/1998 | Sheehan et al. | 211/87.01 |
| 5,820,004 A | 10/1998 | Lane | 224/485 |
| 5,833,078 A * | 11/1998 | York | 211/70.5 |
| 6,044,772 A | 4/2000 | Gaudette et al. | 108/43 |
| 6,155,435 A * | 12/2000 | Malik | 211/41.12 |
| 6,234,436 B1 | 5/2001 | Kump | 248/220.21 |
| 6,311,946 B1 * | 11/2001 | Hoffman | 248/682 |
| 6,398,023 B1 * | 6/2002 | Williams | 206/308.1 |
| 6,414,652 B1 | 7/2002 | Foley | 345/46 |
| 6,568,334 B1 | 5/2003 | Gaudette et al. | 108/43 |
| 6,575,315 B2 | 6/2003 | Zidek | 211/205 |
| 6,722,917 B2 * | 4/2004 | Huang | 439/501 |
| 6,789,771 B1 * | 9/2004 | Shick et al. | 248/121 |
| 6,857,526 B2 * | 2/2005 | Vollmer | 211/65 |
| 7,140,584 B2 * | 11/2006 | Bourque et al. | 248/274.1 |
| 7,140,922 B2 * | 11/2006 | Luu et al. | 439/651 |
| 7,198,835 B2 * | 4/2007 | Anderson | 428/100 |
| 7,285,021 B2 * | 10/2007 | Bell et al. | 439/623 |
| 7,387,224 B1 | 6/2008 | Backus | 224/42.11 |
| 7,669,822 B2 | 3/2010 | Kluge et al. | 248/308 |
| 7,757,911 B2 * | 7/2010 | Barker | 224/153 |
| 2002/0125391 A1 * | 9/2002 | Jackson | 248/309.1 |
| 2003/0142683 A1 * | 7/2003 | Lam et al. | 370/401 |
| 2004/0073820 A1 * | 4/2004 | Hsu | 713/300 |
| 2006/0000790 A1 * | 1/2006 | Smiddy et al. | 211/86.01 |
| 2006/0086870 A1 * | 4/2006 | Nida | 248/176.1 |
| 2006/0151409 A1 * | 7/2006 | Schmoelzer | 211/85.9 |
| 2007/0194752 A1 * | 8/2007 | McBurney | 320/112 |
| 2008/0230987 A1 * | 9/2008 | Jackson | 273/148 B |
| 2009/0179130 A1 * | 7/2009 | Bernard et al. | 248/309.1 |
| 2009/0322279 A1 * | 12/2009 | McBurney | 320/107 |

* cited by examiner

VIDEO GAME CONTROLLER RACK

CROSS REFERENCE TO RELATED APPLICATION

This application is a continuation-in-part application of PCT Appl. No. PCT/US06/16944 filed May 3, 2006 by the Applicant herein, which claims the benefit of the priority date of Provisional Application No. 06/749,932 filed Dec. 13, 2005. Applicant claims the benefit of the earlier filing dates of the PCT application and the provisional application for so much as is common with this application. The subject matter of the PCT application and provisional application is incorporated herein by reference the same as if set forth at length.

FIELD OF THE INVENTION

The present invention relates to a game controller rack for storing game controllers. More particularly, the present invention relates to a game controller rack having cantilever angle members mounted to a vertical member with a range of outwardly and upwardly directed angles to provide a wide range of compatibility of the video game controller rack with various game controllers. Further, the present invention is directed to providing several arrangements of the game controller rack including one which would mount over a game console. Charging and communication functions may be provided by the game controller rack.

BACKGROUND OF THE INVENTION

Home video game consoles, such as Microsoft's X-Box® and X-Box 360®, Sony's PlayStation® consoles and Nintendo's Gamecube® are more popular than ever. Technological advancements now have three or more microprocessors and graphic processors in a single game console allowing phenomenal graphics. A user, often labeled a "gamer", is afforded a surreal gaming experience and has literally hundreds of game titles available to him or her. As the home entertainment and game market expands into literally millions of homes, it is possible in the not-too-distant future that one could envision a home video game system in every home in the world very much the same manner as a television set or personal computer. Even now, there are some homes with two or more game consoles allowing the gamer to play numerous games on various gaming platforms.

Presently, there are at least three major game console manufacturers all using the same style of ergonomic game controller. The style is very conducive to extended game play, all the time protecting the gamer from ill effects, such as carpal tunnel syndrome. A serious gamer probably has at least two game consoles each with at least two game controllers per game console. The gamer would have at least four game controllers connected to its game console via a wire. To eliminate the wild spaghetti effect produced by having wires lying around in front of the display, gamers will purchase wireless game controllers. But, wired or wireless, the storage and the protection of the game controller is paramount to the avid gamer. To avoid an unsightly game room, living room or bedroom, the controller may be stored in a drawer where the wires will eventually become entangled. The wired or wireless game controller may get accidentally damaged if just left lying on the floor or table.

Therefore, what is needed is a game controller storage device that permits the gamer to safely store his or her game controllers. Additionally, the device should be made out of different materials and colors allowing the storage device to become part of the décor.

SUMMARY OF THE INVENTION

The present invention is for a storage rack for game controllers and a method of using it. The present invention provides a safe convenient and practical way of storing game controllers when the game controller is not in use by a gamer. An advantage of the present invention is that it organizes the controllers as well as provides a decorative element to a room.

Briefly and basically, in accordance with the present invention, a game controller rack for storing at least one game controller is provided which includes a vertical member. At least one pair of cantilever angle members are fixably attached to the vertical member. The pair of cantilever angle members have a first and a second cantilever angle member spaced a predetermined distance laterally of each other and are angled outwardly from a line perpendicular to the vertical member at an angle in the range of approximately 18 degrees to approximately 22 degrees, and preferably at 20 degrees. The cantilever angle members are also angled upwardly from a line perpendicular to the vertical member at an angle in the range of approximately 27 degrees to approximately 33 degrees, and preferably angled at 30 degrees upwardly. The pair of cantilever angle members, and preferably a plurality of pairs of cantilever angle members, attach to the vertical member. Each pair of cantilever angle members creates a cradle for a game controller.

In accordance with a presently preferred embodiment, additional pairs of cantilever angle members may be positioned a predetermined distance below or above and on either side of the pair of cantilever angle members.

In another preferred embodiment, the game controller rack may include two vertical members connected together by a strap which is adapted to go over a game console. Each of the vertical members is provided with fixably attached cantilever angle members, with each pair forming a cradle for a game controller.

In another preferred embodiment of the present invention, the game controller rack, and particularly the vertical member, may be provided with a jack such as a USB port for charging the game controllers while stored on the rack.

In another preferred embodiment of the present invention, the video game controller rack is provided with a network card which enables network communication between the game controllers and a secondary network, a game console, a personal computer or the like.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 6b is a partially broken away cross sectional view taken along line 6b-6b of FIG. 6a.

DETAILED DESCRIPTION OF THE PREFERRED EMBODIMENTS

Figures 1, 2:
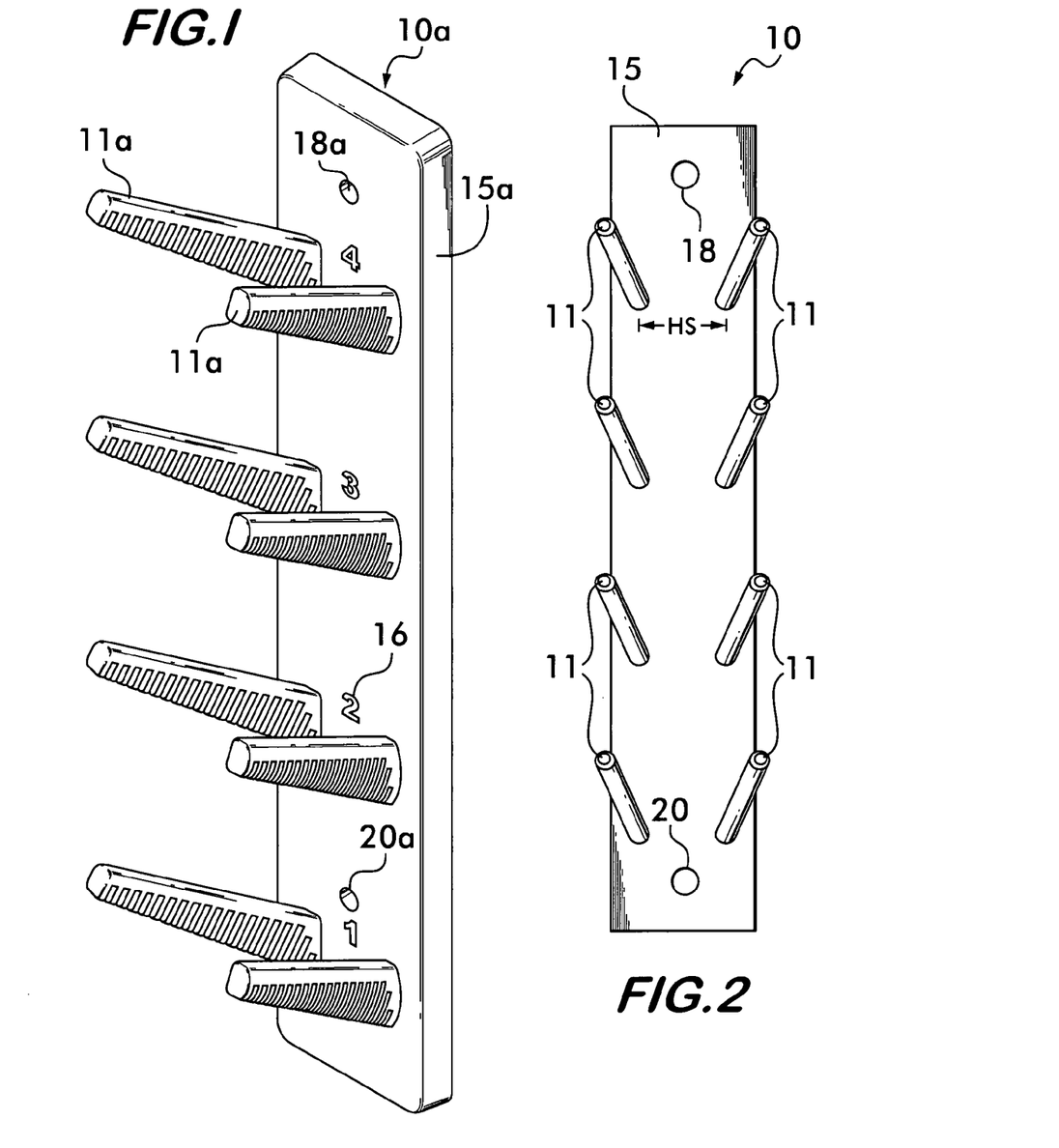
FIG. 1 is a view in perspective of a presently preferred embodiment of the present invention.
FIG. 2 is a front elevation view of another embodiment of the present invention.

Referring now to the drawings, wherein like numerals indicate like elements, there is shown in FIGS. 1 and 2 embodiments of the present invention.

FIG. 1 is a presently preferred embodiment of a video game controller rack 10a in accordance with the present invention. FIG. 2 illustrates another embodiment of a video game controller rack 10 in accordance with the present invention. The game controller rack of the present invention may be made of any suitable material including plastic, wood, aluminum, other metals and other rigid materials. FIG. 1 is preferably at present molded from plastic. FIG. 2 at present is preferably made from wood. As illustrated in FIGS. 1 and 2, a plurality of cantilever angle members or posts 11a in FIGS. 1 and 11 in FIG. 2 are fixed in pairs to vertical member or video game controller base 15a in FIGS. 1 and 15 in FIG. 2 to create a cradle in which to securely store video game controllers.

As illustrated in FIG. 1, the cradle positions may be provided with indicia 16 such as numerals 1-4 indicated therein for indicating the video game controller space.

The vertical member or game controller base 15/15a is provided with support means for supporting the vertical member 15/15a in a vertical position. This support means may be screw or other fastener holes 18 and 20 for securing the vertical member 15/15a to a vertical surface such as a wall or it may be provided with a mounting base to hold vertical member 15/15a in a vertical position.

In all embodiments, a pair of cantilever angle members in conjunction with a portion of the vertical or base member of the game controller rack creates a cradle for a game controller. Referring specifically to FIG. 1, the pair of cantilever angle members 11a fixably attached to vertical member 15a create a cradle for a game controller (not shown in FIG. 1). A game controller cradle on the upper pair of cantilever vertical members is illustrated in FIG. 4 in dotted outline 30.

Figure 3:
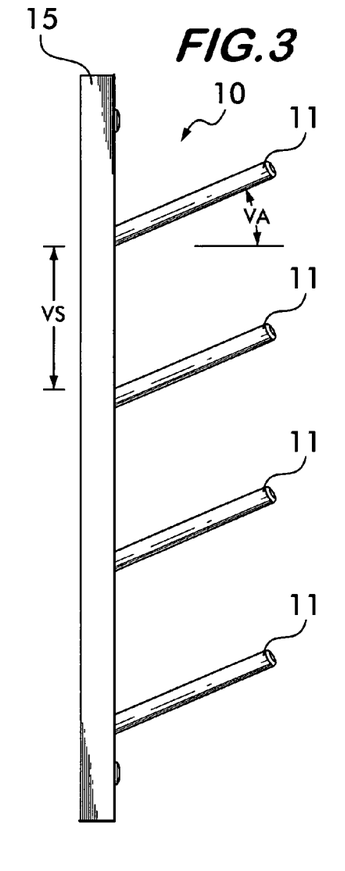
FIG. 3 is a side elevation view of the embodiment of the present invention shown in FIG. 2.
Figure 5:
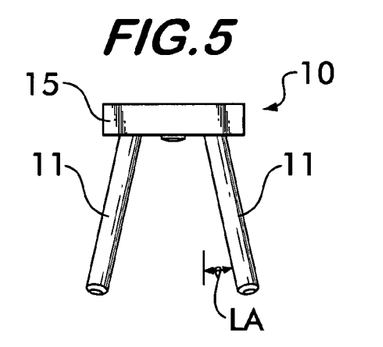
FIG. 5 is a top or plan view of the embodiment of the present invention shown in FIG. 2.

The cantilever angle members of each pair of cantilever angle members are spaced a predetermined distance apart. This distance center to center is illustrated as HS for horizontal spacing in FIG. 2. This center to center spacing is the same for all embodiments and is preferably approximately 1½ inches center to center. Referring to the side view of FIG. 2 shown in FIG. 3, there is a vertical spacing indicated as VS between cantilever angle members 11. This distance is preferably at least approximately 2½ inches to enable sufficient space for the game controller to be positioned in its cradle. FIG. 3 also indicates a vertical angle of cantilever angle members 11 by the angle VA which is an angle formed between the cantilever angle member of post 11 and a perpendicular or normal line to vertical member 15. This angle is preferably approximately 27 degrees to approximately 33 degrees. In a presently preferred embodiment, the angle is 30 degrees. In the plastic molded embodiments, such as the embodiment of FIG. 1, this angle would be the angle formed between a perpendicular or normal to vertical member 15a and the upper surface of cantilever angle members 11a. As illustrated in FIG. 1, cantilever angle members 11a in FIG. 1 may be provided with a taper to provide additional strength and may be provided with recesses to reduce the amount of plastic required in the molding process. Cantilever angle members 11 and 11a are also angled outwardly from a line perpendicular or normal to the vertical member 15 as shown in top of plan view of FIG. 2 as illustrated in FIG. 5. The outward angle of cantilever angle members 11 and 11a from a line perpendicular to the vertical member illustrated as LA for lateral angle is between 18 and 22 degrees, in a presently preferred embodiment is 20 degrees. All of the cantilever angle members 11a and 11 of the embodiments of FIGS. 1 and 2 are provided with these angles and spacings. Also, the cantilever angle members 11b, 11c, 11d and 11e of the other embodiments are arranged with the same spacing and angles to create the cradle for the game controllers. Although the pairs of cantilever angle members are shown in FIGS. 1 and 2 as being spaced vertically, it is understood that they may be spaced laterally on a base member or vertical member to create a pattern of storing game controllers which are side by side rather than vertically one above the other. Such arrangement would have the same angles in spacing as just described.

Figure 4:
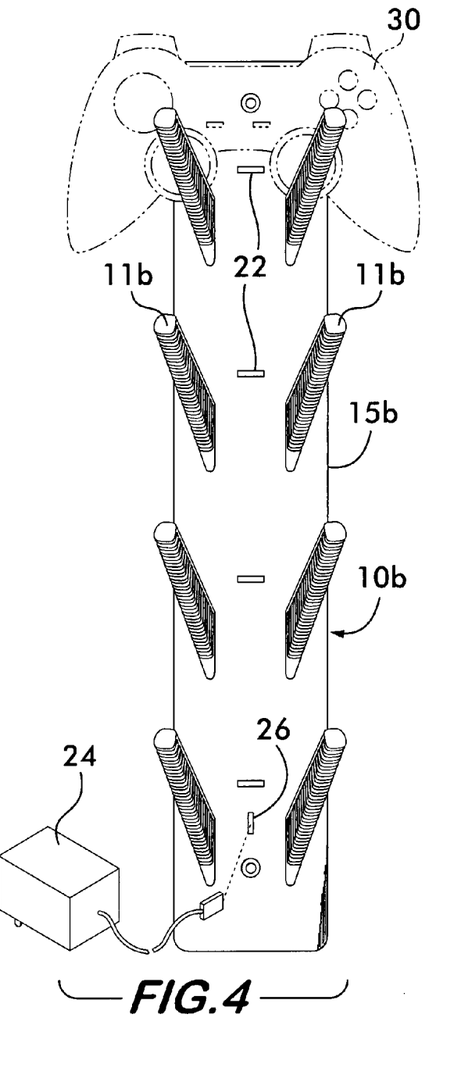
FIG. 4 is a front elevation view of another preferred embodiment of the present invention illustrating a game controller rack of the present invention provided with USB ports.
Figure 4A:
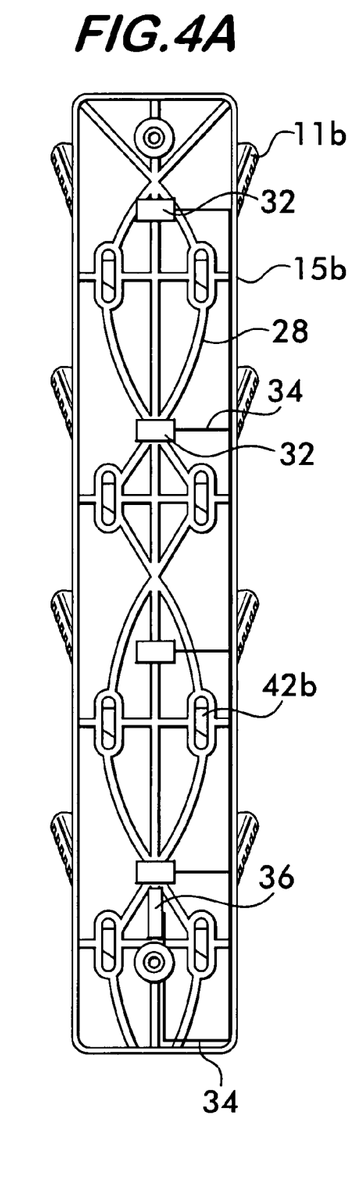
FIG. 4a is a back elevation view of the embodiment shown in FIG. 4.

Referring now to FIGS. 4 and 4a, there is shown another embodiment of the present invention wherein universal serial bus (USB) ports are provided, one for each game controller. As described with respect to the previous embodiment, the cantilever angle members or posts 11b are mounted to vertical member or base 15b. These are provided with USB ports 22, one for each game controller position. USB ports 22 are provided with power for charging game controllers, such as game controller 30, from a power supply 24 via jack 26.

FIG. 4a is a rear view or back view of the embodiment of FIG. 4 and illustrates the housing structure 32 of USB ports which are connected via wire or cable 34 to power input jack, the rear thereof which is shown at 36. FIG. 4a also shows ribbing 28 which is provided for rigidity to the vertical member structure such as 15a, 15b, 15c, 15d and 15e.

Figure 7:
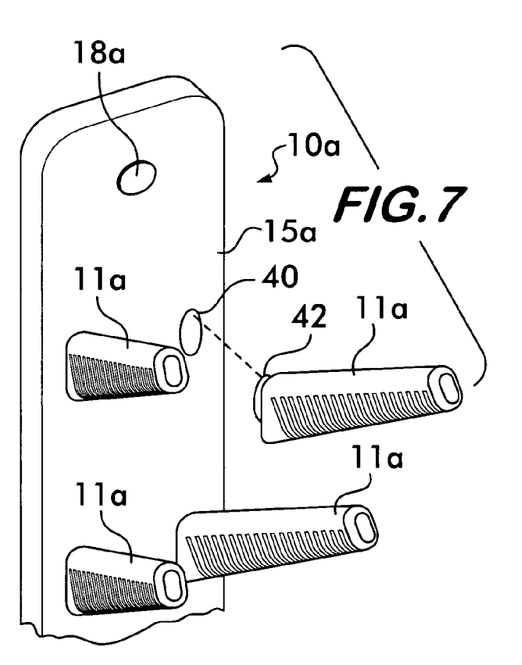
FIG. 7 is a partially broken away view in perspective of the embodiment of the invention illustrated in FIG. 1 showing a cantilever angle member being fixably attached to a vertical member.

Referring now to FIG. 7, there is shown one of the cantilever angle members or posts 11a being inserted into opening into which resilient snap or interlocking retainer mechanism 42 is being inserted to fixably attach cantilever angle member 11a to vertical member 15a. Resilient snaps or interlocking retainer mechanism 42 are also illustrated in FIG. 4a at 42b. Holes 18a and 20a formed in vertical member 15a are adapted to receive fasteners, such as screws, for securing the vertical member 15a to a structure. Other interlocking retainer means may be utilized to secure cantilever angle members 11a, 11b, 11c, 11d and 11e to vertical members 15a, 15b, 15c, 15d and 15e, respectively, including but not limited to friction or an adhesive or other bonding substance.

Figure 8:
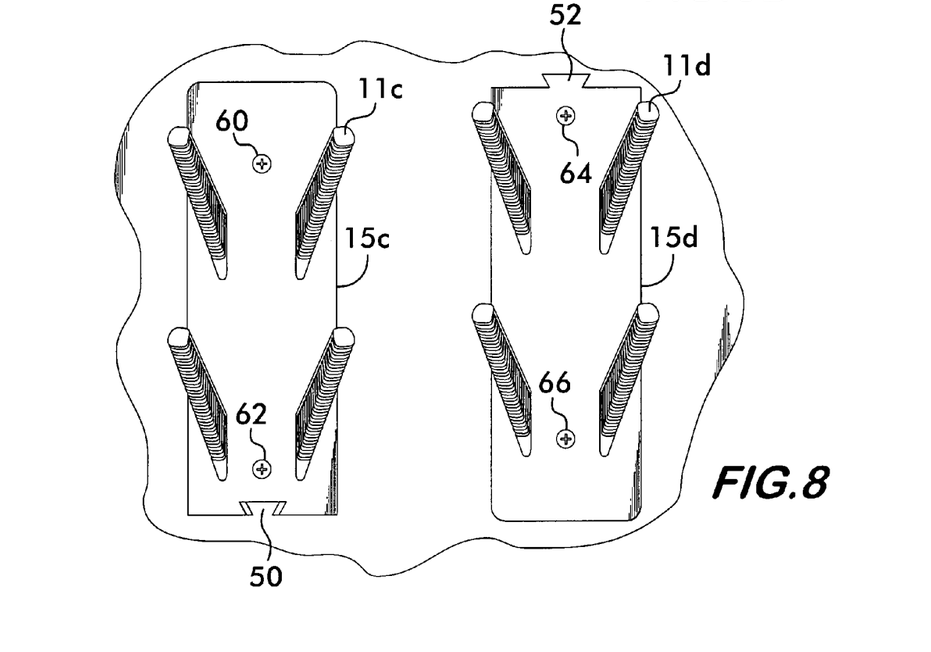
FIG. 8 is a front elevation view of another embodiment of the present invention illustrating the two sections of the embodiment of FIG. 6 mounted to a vertical surface.

Referring now to FIGS. 6, 6a, 6b and FIG. 8, there is shown another embodiment of the present invention wherein a second game controller rack is provided or the rack of FIG. 1 is bifurcated into two vertical sections. In other words, a game controller rack similar to FIG. 1 may be bifurcated into a first vertical member 15c and a second vertical member 15d. This is best illustrated in FIG. 8 wherein two sections are shown wherein they may be connected together by a dovetail which only goes together in one direction. The dovetail is shown at 50 and 52. As may be seen in FIG. 8, the female section, dovetail 50, has a tapered side and a matching tapered side on the male portion of dovetail 52 such that they may be connected together in only one manner. Putting them together, the two sections may be secured to a vertical surface by fasteners 60, 62, 64 and 66 with 15c above vertical member 15d to form a structure similar to that shown in FIG. 1. Alternatively, they may be mounted side by side or in any other manner as illustrated in FIG. 8.

Figure 6:
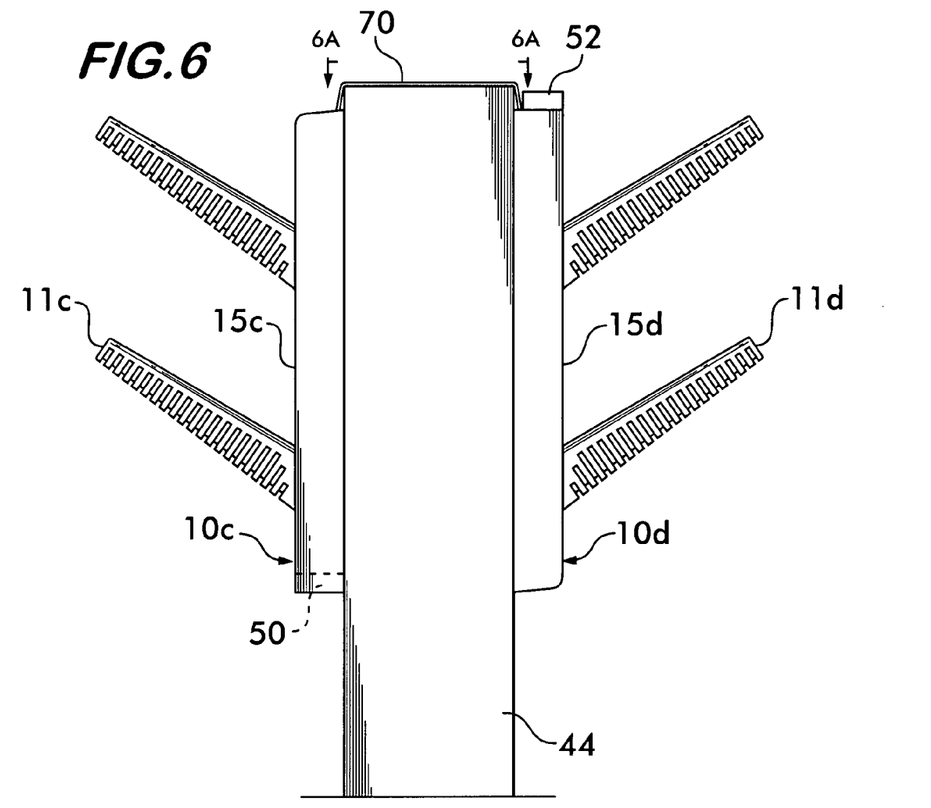
FIG. 6 is a side elevation view of another embodiment of the present invention illustrating two vertical members having cantilever angle members attached thereto mounted over a game console by a strap.
Figure 6A:
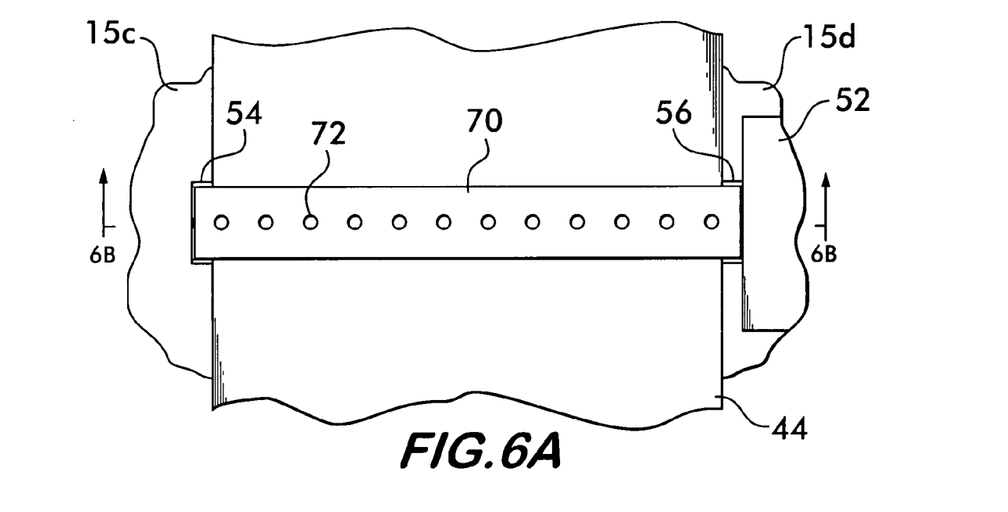
FIG. 6a is a partially broken away plan view of FIG. 6 illustrating the strap and its insertion into the vertical members.
Figure 6B:
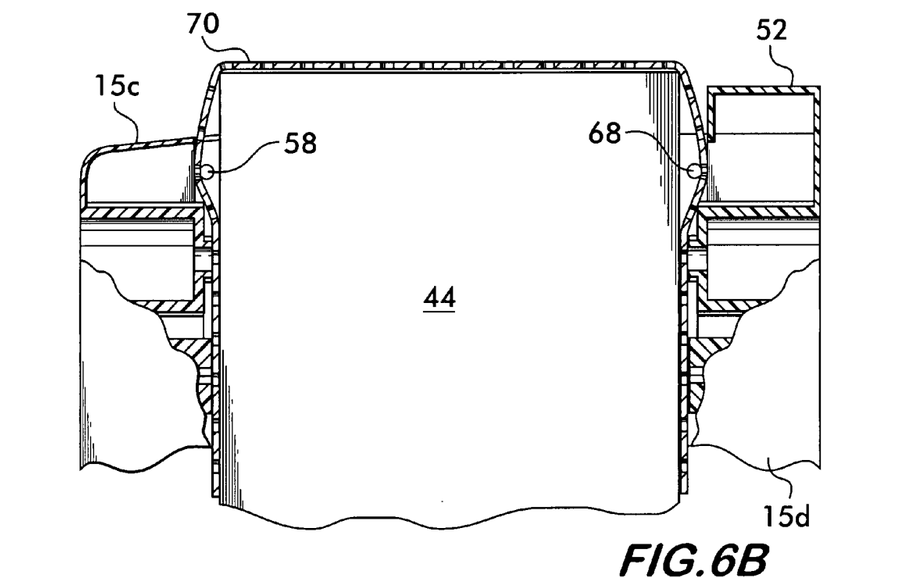

The embodiment of FIGS. 6, 6a, 6b and FIG. 8 may be mounted over a console as shown in FIGS. 6, 6a and 6b. The video game controller racks 10c and 10d may be mounted over a video console 44 by means of strap 70. Strap 70 fits into inserts, channels or openings 54 and 56. Strap 70 has holes 72 through which ball headed pins 58 and 68 are pressed to mount vertical members 15c and 15d to strap 70. Other suitable means may be utilized to attach strap 70 to vertical member 15c and 15d.

Figure 9:
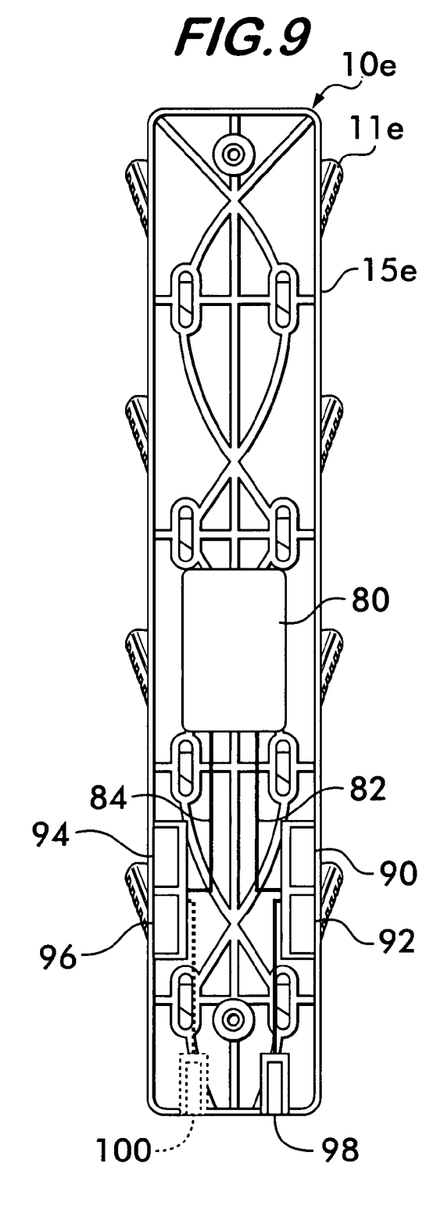
FIG. 9 is a back elevation view of another embodiment of the present invention provided with a network card.
Figure 10:
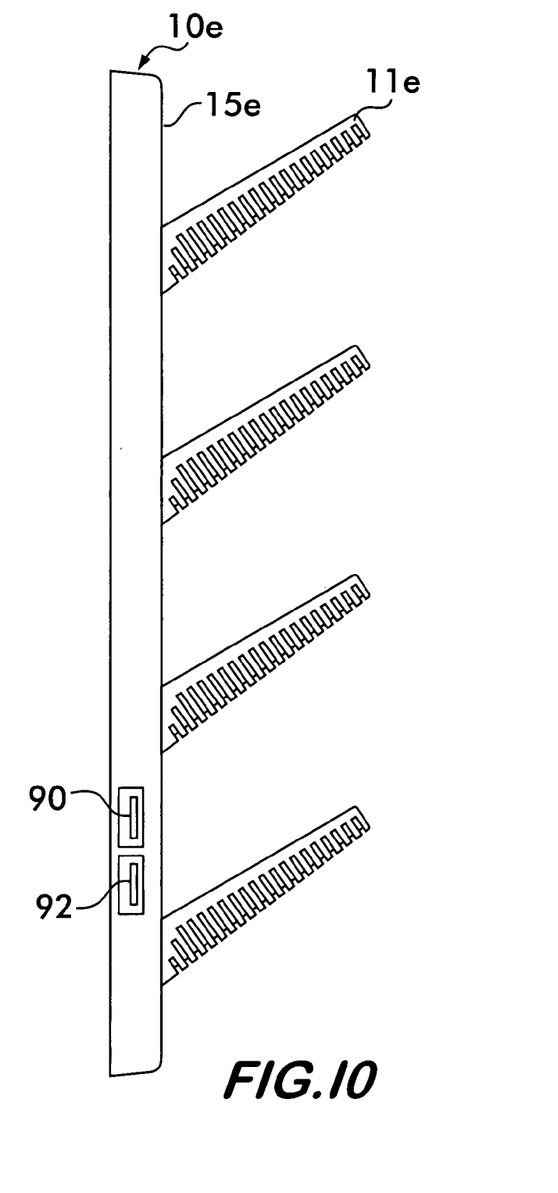
FIG. 10 is a side elevation view of the embodiment of FIG. 9.

Referring now to FIGS. 9 and 10, there is shown another embodiment of a video game controller rack 10e having a vertical member 15e and cantilever angle members 11e spaced and angle as described previously. The embodiment of FIGS. 9 and 10 contains a network card 80 mounted in the back of vertical member 15e. Network card 80 is connected via cables 82 and 84 to USB ports 90, 92, 94 and 96. USB cables to be connected into ports 90, 92, 94 and 96 an connected to game controllers placed on game controller rack 10e. Network card 80 may receive power via jack 98. Network card 80 may be a wireless network card or it may be a wire card connected to other devices or networks via the optional port 100. Network card 80 and its associated USB ports may be used both for communication and for charging the game controllers. The game controllers via the network card may communicate with a secondary network, a personal computer, a game console or other device.

The video game controller rack 10 can be utilized to securely store game controllers for Microsoft's X-Box and X-Box 360 game consoles. In addition, Sony's PlayStation®, PlayStation 2® and possibly the pending PlayStation 3® controllers can also be securely stored. The Nintendo Gamecube® and possibly the anticipated Nintendo Revolution® controllers can also be securely stored. It is quite possible that the present invention can be utilized with many game controllers.

In preferred embodiments the video game controller rack 10, 10a, 10b, 10c, 10d and 10e assembled by a gamer by affixing an interlocking pair of the plurality of cantilever posts 11, 11a, 11b, 11c, 11d and lie into the video game controller rack 15, 15a, 15b, 15c, 15d and 15e. The embodiments permit the present invention to be efficiently shipped as a flat pack item to save on shipping costs. The savings can be seen when the present invention is shipped by the manufacturer, wholesaler or retailer.

In another embodiment, video game controller rack 10 can be rotated to a horizontal position and the pairs of plurality of cantilever posts 11 are affixed at a 90 degree angle from the above embodiments permitting a new game controller mounting pattern.

In yet another embodiment, the weight of the actual game console would support a first bottom piece which is attached in a cantilever fashion permitting the video game controller rack 10 to be suspended over or near the game console.

Furthermore, the cantilever arm could be replaced by a plurality of support members which would support the game controller rack.

In another embodiment the materials used in fabrication of the video game controller rack 10, 10a, 10b, 10c, 10d and 10e can be plastic, wood or metal permitting the video game controller rack 10, 10a, 10b, 10c, 10d and 10e to be suitable for the gamers' chosen décor. An advantage of plastic is that it can be easily created by an injection molding system. The wooden version can be finished in a plethora of stains or glosses to match other pieces of furniture in the gamers' gaming room. The metal version can also be made from a plethora of materials which produces a variety of finishes. Additionally, the metal version can be anodized or plated to again produce the variety of finishes.

In another embodiment shown in FIGS. 4 and 4A, the cradle formed by the plurality of cantilever posts 11b has a universal serial bus (USB) adapter. The USB adapter connects to the game controller allowing the game controller rack 10b to recharge a wireless game controller. This embodiment also allows USB communication between a game controller and the game controller rack 10b. For example, the game console can extract the status of the battery of the game controller through the game controller rack 10b as the game controller rack 10b charges the game controller. In addition, the game controller rack 10b can be utilized with personal computers, running Microsoft Windows, Apple O/S (Operating System), Linux or any personal computer operating system.

In another embodiment shown in FIGS. 9 and 10, the present invention can be utilized as a network hub which attaches a wireless or wired game controller with a network. This allows a personal computer or any network machine to obtain a status of the game controller. The network can also be utilized as a communication link between the game controller and the gaming machine.

In yet another embodiment, the above mentioned USB is replaced with an appropriate power plug which matches the power plug requirements of the game controller. The appropriate power plug may also have a communication system to be utilized to converse with the game controller and another machine.

An additional embodiment shown in FIGS. 6, 6A and 6B has the game controller storage rack of FIG. 1 bifurcated readily into two distinct sections along the horizontal axis. A new element, such as a strap is added to join the two sections to create a "saddle bag" type device. The new element or strap is placed directly on the game console. The strap can be made out of a flexible material such as nylon or a hard plastic. The hard plastic strap can be form shaped to cover a specific game console.

In accordance with the method of the present invention, there is provided a method of storing game controllers which includes the steps of providing a game controller rack 10, 10a, 10b, 10c, 10d or 10e as shown and described and placing at least one game controller on the game controller rack. In this manner, the game controller may be stored safely and securely out of the way and in a safe place. The game controller is cradled between the cantilever angle members and the vertical member.

Further, in accordance with the method of the present invention, a game controller stored on the game controller rack may be connected to a power connector for charging the game controller and charging the game controller while it is stored on the game controller rack.

Further, in accordance with the method of the present invention, the method may include the step of connecting the game controller to a network connection on the vertical connection of the game controller rack and causing the game controller to communicate with a secondary network.

Further, in accordance with the method of the present invention, the method may include the steps of providing the game controller rack with a network communication device and causing the game controller to communicate via a wireless network transceiver with a secondary network.

It should be understood that the disclosed embodiments of the present invention are not limited in its application to the details of the particular arrangements shown, since the invention is capable of other embodiments. Also, the terminology used herein is for the purpose of description and not of any limitation.

The present invention may be embodied in other specific forms without departing from the spirit or essential attributes thereof and, accordingly, reference should be made to the appended claims, rather than to the foregoing specification as indicating the scope of the invention.

I claim:

1. A game controller rack for storing at least one game controller, comprising:
    a vertical member;
    at least one pair of cantilever angle members fixably attached to said vertical member; and
    said pair of cantilever angle members having a first and a second cantilever angle member spaced a predetermined distance laterally of each other and angled outwardly from a line perpendicular to said vertical member, at an angle in the range of approximately 18 degrees to approximately 22 degrees and angled upwardly from a line perpendicular to said vertical member at an angle in the range of approximately 27 degrees to approximately 33 degrees,
    wherein said at least one pair of cantilever angle members attaches to said vertical member creating a cradle for at least one game controller, and
    the vertical member is provided with a connector for providing power to said game controller, the vertical member provided with at least one network connector adapted to connect to at least one of said game controllers creating a network access point, or the vertical member provided a transceiver for communicating with at least one wireless game controller and a gaming network.

2. The game controller rack in accordance with claim 1 including a second pair of cantilever angle members positioned a predetermined vertical distance below said pair of cantilever angle members, said second pair of cantilever angle members having a first and second cantilever angle member spaced a predetermined distance laterally of each other and angled outwardly from a line perpendicular to said vertical member at an angle in the range of approximately 18 degrees to approximately 22 degrees and angled upwardly from a line perpendicular to said vertical member at an angle in the range of approximately 27 degrees to approximately 33 degrees.

3. The game controller rack in accordance with claim 2, wherein said second pair of cantilever angle members is positioned a predetermined distance below said pair of cantilever angle members of at least approximately 2½ inches.

4. The game controller rack in accordance with claim 1 having a lateral pair of cantilever angle members positioned laterally of said pair of cantilever angle members, said lateral pair of cantilever angle members having a first and a second cantilever angle member spaced a predetermined distance laterally of each other and angled outwardly from a line perpendicular to said vertical member at an angle in the range of approximately 18 degrees to approximately 22 degrees and angled upwardly from a line perpendicular to said vertical member at an angle in the range of approximately 27 degrees to approximately 33 degrees.

5. The game controller rack in accordance with claim 1, wherein said first and second cantilever angle members are angled outwardly from a line perpendicular to said vertical member at an angle of approximately 20 degrees.

6. The game controller rack in accordance with claim 1, wherein said first and second cantilever angle members are angled upwardly from a line perpendicular to said vertical member at an angle of approximately 30 degrees.

7. The game controller rack in accordance with claim 1, wherein said first and second cantilever angle members have a predetermined distance laterally of each other of approximately 1½ inches center to center.

8. The game controller rack in accordance with claim 1, wherein said vertical member is provided with support means.

9. The game controller rack in accordance with claim 8, wherein said support means includes holes formed in said vertical member adapted to receive fasteners for securing said vertical member to a structure.

10. The game controller rack in accordance with claim 1 including a second game controller rack in accordance with claim 1, wherein said two game controller racks are connected by at least one strap, said strap being adapted to be placed over a game console.

11. The game controller rack in accordance with claim 10, wherein said game controller rack and said second game controller rack are provided with connecting means for connecting together said game controller racks for mounting on a vertical surface.

12. The game controller rack in accordance with claim 11, wherein said connecting means is a one way dovetail structure for connecting together said game controller racks.

13. The game controller rack in accordance with claim 1, wherein said pair of cantilever angle members is fixably attached to said vertical member by insertion of said first and second cantilever angle members into said vertical member by an interlocking retainer means, said interlocking retainer means being a mechanical interlocking mechanism, friction or a bonding substance.

14. The game controller rack in accordance with claim 1, wherein when the vertical member is provided with a connector for providing power to said game controller, said connector for providing power is a an universal bus connector.

15. A method of storing game controllers comprising the steps of:
    providing a game controller rack comprising:
        a vertical member,
        at least one pair of cantilever angle members fixably attached to said vertical member, and
        said pair of cantilever angle members having a first and a second cantilever angle member spaced a predetermined distance laterally of each other and angled outwardly from a line perpendicular to said vertical member, at an angle in the range of approximately 18 degrees to approximately 22 degrees and angled upwardly from a line perpendicular to said vertical member at an angle in the range of approximately 27 degrees to approximately 33 degrees,
    wherein said at least one pair of cantilever angle members attaches to said vertical member creating a cradle for at least one game controller and the vertical member provided is with a connector for providing power to said game controller, the vertical member is provided with at least one network connector adapted to connect to at least one of said game controllers creating a network access point, or the vertical member is provided with a transceiver for communicating with at least one wireless game controller and a gaming network;

placing at least one game controller on said game controller rack;

connecting said game controller to said network connection on said vertical member of said game controller rack; and causing said game controller to communicate with a secondary network.

16. The method in accordance with claim 15 including the steps of:

connecting said game controller stored on said game controller rack to a power connector for charging said game controller; and charging said game controller while it is stored on said game controller rack.

17. A method of storing game controllers, comprising the steps of:

providing a game controller rack comprising:
a vertical member,
at least one pair of cantilever angle members fixably attached to said vertical member, and
said pair of cantilever angle members having a first and a second cantilever angle member spaced a predetermined distance laterally of each other and angled outwardly from a line perpendicular to said vertical member, at an angle in the range of approximately 18 degrees to approximately 22 degrees and angled upwardly from a line perpendicular to said vertical member at an angle in the range of approximately 27 degrees to approximately 33 degrees, wherein said at least one pair of cantilever angle members attaches to said vertical member creating a cradle for at least one game controller and the vertical member is provided with a connector for providing power to said game controller, the vertical member is provided with at least one network connector adapted to connect to at least one of said game controllers creating a network access point, or the vertical member is provided with a transceiver for communicating with at least one wireless game controller and a gaming network;

placing at least one game controller on said game controller rack;

providing said game controller rack with a network communication device; and causing said game controller to communicate via said wireless network transceiver with a secondary network.

* * * * *